(12) United States Patent
Lindley et al.

(10) Patent No.: US 11,242,201 B2
(45) Date of Patent: Feb. 8, 2022

(54) METHOD AND GOODS STORAGE SYSTEM FOR PICKING GOODS WITH EFFICIENTLY OPERATED DYNAMIC BUFFER

(71) Applicant: TGW Logistics Group GmbH, Marchtrenk (AT)

(72) Inventors: Timothy Lindley, Schwerte (DE); Harald Johannes Schroepf, Wels (DE)

(73) Assignee: TGW Logistics Group GmbH, Marchtrenk (AT)

( * ) Notice: Subject to any disclaimer, the term of this patent is extended or adjusted under 35 U.S.C. 154(b) by 239 days.

(21) Appl. No.: 16/617,657

(22) PCT Filed: May 29, 2018

(86) PCT No.: PCT/AT2018/060109
§ 371 (c)(1),
(2) Date: Dec. 2, 2019

(87) PCT Pub. No.: WO2018/218266
PCT Pub. Date: Dec. 6, 2018

(65) Prior Publication Data
US 2021/0300682 A1   Sep. 30, 2021

(30) Foreign Application Priority Data
Jun. 2, 2017  (AT) ............................... A 50463/2017

(51) Int. Cl.
*B65G 1/137* (2006.01)
*B65G 47/68* (2006.01)
(Continued)

(52) U.S. Cl.
CPC ......... *B65G 1/1378* (2013.01); *B65G 1/1376* (2013.01); *B65G 47/684* (2013.01);
(Continued)

(58) Field of Classification Search
CPC .......................... B65G 2209/02; B65G 1/1378
See application file for complete search history.

(56) References Cited

U.S. PATENT DOCUMENTS

| 5,222,855 A * | 6/1993 | Bernard, II | .......... | B65G 1/0485 |
| | | | | 198/340 |
| 5,273,392 A * | 12/1993 | Bernard, II | .......... | B65G 1/1371 |
| | | | | 414/807 |

(Continued)

FOREIGN PATENT DOCUMENTS

| AU | 200187244 A | 5/2002 |
| CN | 102264613 A | 11/2011 |

(Continued)

OTHER PUBLICATIONS

International Search Report in PCT/AT2018/060109, dated Oct. 10, 2018.

*Primary Examiner* — Thomas Randazzo
(74) *Attorney, Agent, or Firm* — Collard & Roe, P.C.

(57) ABSTRACT

The invention relates to a method for picking order goods which are allocated to an order comprising a plurality of shipping containers. In the method, order goods allocated to the order are removed from a store (2), transported into a dynamic buffer (5, 5a, 5b) and stored there temporarily. The dynamic buffer (5, 5a, 5b) comprises an infeed line (6), an outfeed line (7), a plurality of buffer lanes (8) arranged between the infeed line (6) and the outfeed line (7), and at least one return lane (9) arranged therebetween. If a portion of the order goods available in the dynamic buffer (5, 5a, 5b) is sufficient to fill a predefinable number of shipping containers and is ready for packing, this portion of the order goods ready for packing is discharged from the dynamic buffer (5, 5a, 5b), transported to a picking workstation (10) and transferred, there, into the predefined number of shipping containers. The predefined number of shipping con- (Continued)

Figure 1:
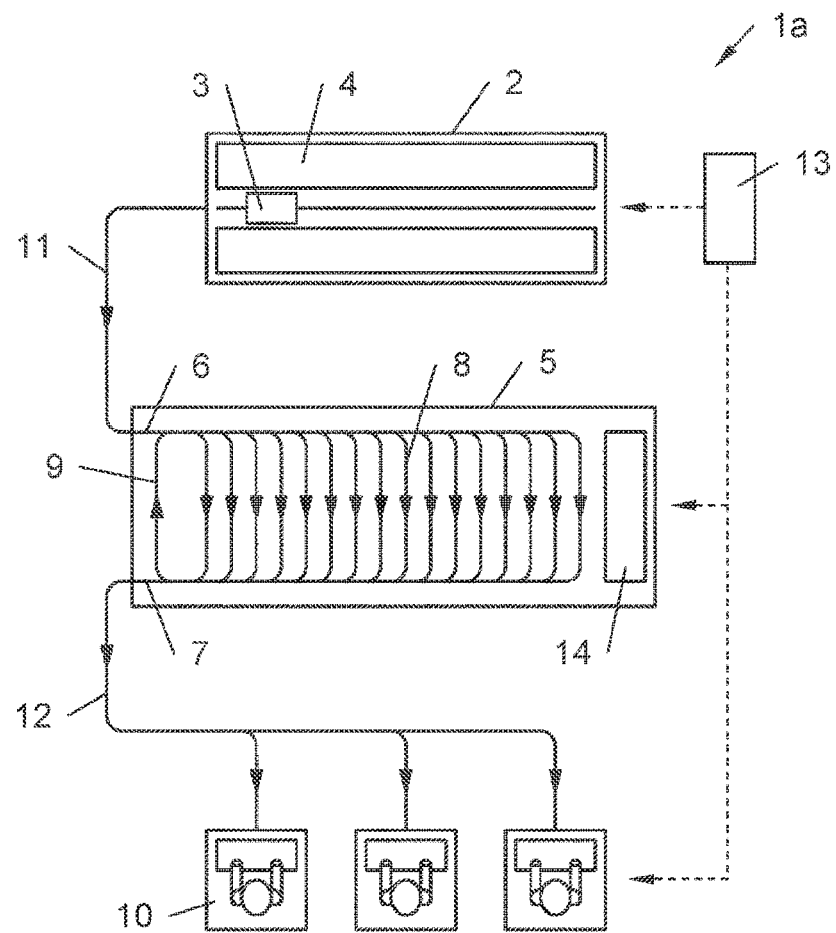

tainers is smaller here than the total number of shipping container necessary to fulfill the order. The invention also relates to a goods storage system (1*a* . . . 1*g*) for carrying out said method.

27 Claims, 7 Drawing Sheets

(51) Int. Cl.
*G06Q 10/08* (2012.01)
*B65G 47/69* (2006.01)
(52) U.S. Cl.
CPC .......... *B65G 47/69* (2013.01); *G06Q 10/087* (2013.01); *B65G 2201/0229* (2013.01); *B65G 2209/02* (2013.01); *B65G 2209/10* (2013.01)

(56) References Cited

U.S. PATENT DOCUMENTS

| | | | |
|---|---|---|---|
| 5,509,538 A * | 4/1996 | Spindler | B65G 1/1376 209/630 |
| 5,664,928 A | 9/1997 | Stauber | |
| 5,687,851 A | 11/1997 | Schoenenberger | |
| 6,768,929 B2 | 7/2004 | Roesch | |
| 8,480,347 B2 | 7/2013 | Schaefer | |
| 8,718,815 B2 | 5/2014 | Shimamura | |
| 9,014,843 B2 | 4/2015 | Winkler | |
| 9,205,982 B2 | 12/2015 | Winkler | |
| 9,296,561 B2 | 3/2016 | Wend et al. | |
| 9,580,248 B2 | 2/2017 | Hasman et al. | |
| 9,751,693 B1 * | 9/2017 | Battles | B25J 9/0093 |
| 9,760,086 B2 | 9/2017 | Woodtli et al. | |
| 10,062,046 B2 | 8/2018 | Ogden | |
| 10,252,862 B2 | 4/2019 | Mathi et al. | |
| 10,579,965 B2 | 3/2020 | Meurer | |
| 2002/0117429 A1 | 8/2002 | Takizawa | |
| 2011/0170998 A1 | 7/2011 | Winkler | |
| 2013/0031876 A1 | 2/2013 | Fritzsche | |
| 2016/0194153 A1 * | 7/2016 | Issing | B65G 1/137 700/216 |
| 2016/0229634 A1 * | 8/2016 | Yamashita | B65G 1/1378 |
| 2018/0009605 A1 * | 1/2018 | Collin | B65G 1/137 |
| 2018/0186572 A1 * | 7/2018 | Issing | B65G 1/1375 |
| 2018/0237222 A1 * | 8/2018 | Issing | B65G 1/1376 |
| 2018/0244473 A1 * | 8/2018 | Mathi | B65B 35/44 |
| 2018/0319592 A1 * | 11/2018 | Yamashita | B65G 1/0492 |
| 2020/0071077 A1 * | 3/2020 | Winkler | B65G 1/06 |

FOREIGN PATENT DOCUMENTS

| | | |
|---|---|---|
| CN | 102844251 A | 12/2012 |
| CN | 103764523 A | 4/2014 |
| CN | 105612541 A | 5/2016 |
| CN | 106687395 A | 5/2017 |
| CN | 106715292 A | 5/2017 |
| DE | 100 19 632 A1 | 10/2001 |
| DE | 10 2005 061 309 A1 | 7/2007 |
| DE | 10 2011 104 511 B3 | 10/2012 |
| DE | 10 2012 220 479 A1 | 5/2014 |
| DE | 10 2013 015 456 A1 | 3/2015 |
| EP | 0 627 371 A1 | 12/1994 |
| EP | 0 737 634 A2 | 10/1996 |
| EP | 1 205 406 A1 | 5/2002 |
| EP | 2 639 186 A2 | 9/2013 |
| EP | 2 581 329 B1 | 7/2014 |
| EP | 2 789 555 A1 | 10/2014 |
| EP | 2 949 606 A1 | 12/2015 |
| WO | 02/26599 A1 | 4/2002 |
| WO | 2008/089980 A1 | 7/2008 |
| WO | 2010/022832 A1 | 3/2010 |
| WO | 2017/017605 A1 | 2/2017 |
| WO | 2017/027897 A1 | 2/2017 |

* cited by examiner

METHOD AND GOODS STORAGE SYSTEM FOR PICKING GOODS WITH EFFICIENTLY OPERATED DYNAMIC BUFFER

CROSS REFERENCE TO RELATED APPLICATIONS

This application is the National Stage of PCT/AT2018/060109 filed on May 29, 2018, which claims priority under 35 U.S.C. § 119 of Austrian Application No. A 50463/2017 filed on Jun. 2, 2017, the disclosure of which is incorporated by reference. The international application under PCT article 21(2) was not published in English.

The invention relates to a method for picking order goods which are allocated to an order of a plurality of orders, wherein the order comprises a plurality of shipping containers. In the method, said order is acquired and order goods allocated to the order are removed from a store. Subsequently, the order goods are transported into a dynamic buffer having an infeed line and an outfeed line, a plurality of buffer lanes arranged between the infeed line and the outfeed line as well as at least one return lane arranged between the outfeed line and the infeed line, and the order goods are stored temporarily in at least one buffer lane of the dynamic buffer. In a second step, the order goods are discharged from the dynamic buffer via its outfeed line, the order goods are transported to a picking workstation and a shipping container provisioned at the picking workstation is filled with order goods.

The invention also relates to a goods storage system for picking order goods which are allocated to at least one order comprising a plurality of shipping containers, having a store in which the order goods are storable, a dynamic buffer having an infeed line and an outfeed line, a plurality of buffer lanes arranged between the infeed line and the outfeed line as well as at least one return lane arranged between the outfeed line and the infeed line as well as a picking workstation for filling a shipping container provisioned at the picking workstation with order goods. The goods storage system also comprises a conveying device adapted to transport order goods to the dynamic buffer and from the dynamic buffer to the picking workstation, and an order computer configured to acquire an order.

In this context, EP 2 581 329 B1 discloses a system for picking orders having at least one good assigned to an order and/or for managing returns. The system comprises an overhead rail plant having trolleys, object spaces, a batch buffer as well as a plurality of conveyor sections and packing stations. According to the proposed method, all trolleys with the goods of an order are removed from the batch buffer and supplied to a packing station as soon as all goods of the order are stored completely in the batch buffer and/or the order is qualified for retrieval.

This procedure has a number of disadvantages.

In the method proposed in EP 2 581 329 B1, a complete order must be able to be stored temporarily in the batch buffer. For this reason alone, the batch buffer must be disposed relatively large. Also the other means in the goods storage system of EP 2 581 329 B1, such as sorting means, must be disposed relatively large, as they must accommodate the total number of goods of an order to process the flow of conveyed goods. In addition, the dwell time of the goods of an order in the batch buffer is relatively long, thereby making the order picking process lengthy as well.

As a rule, it is also an object to store temporarily a complete order in one single buffer lane of the batch buffer, if possible. As a consequence, the batch buffers of the art, as a rule, comprise very long buffer lanes, whereby the known batch buffers have a rather unfavorable length-to-width ratio and/or a rather unfavorable length-to-height ratio. This requirement for the batch buffer can only be achieved by a small number of possible embodiments. This means that the engineer of a goods storage system does not have much flexibility with regard to the design of the batch buffer. As a consequence, the known batch buffers are relatively hard to integrate into the structure of a goods storage system.

In addition, the probability of a complete order occupying only one single buffer lane is very low without further intervention (i.e. without a sequenced removal or adequate processing of the flow of conveyed goods upstream of the batch buffer). The method taking place in the batch buffer and the discharge of the goods from the batch buffer are therefore relatively complicated and/or require high processing capacities.

Without further measures, it is almost impossible for continued flows of conveyed goods to form in the goods storage system, and the flows of conveyed goods have only a very low efficiency, i.e. only a low degree of order and/or only a low degree of sorting within the flow.

In addition, the long buffer lanes commonly used in the prior art have a low energy efficiency, as the probability for goods belonging to not only one order to be moved is low and therefore the share of energy required for the inherently unnecessary movement of goods not belonging to an order is high.

For said reasons, the goods storage system known from the prior art and in particular its batch buffer cannot be operated efficiently.

It is therefore one object of the invention to specify an improved method and an improved goods storage system for picking order goods. In particular the above-mentioned disadvantages are to be overcome.

The object of the invention is achieved with a method of the kind mentioned at the beginning, in which
  it is checked whether a portion of the order goods available in the dynamic buffer is sufficient to fill a predefinable number of shipping containers and is therefore ready for packing and
  the portion of the order goods ready for packing is discharged from the dynamic buffer, transported to the picking workstation and transferred there into the predefined number of shipping containers, wherein
  the predefined number of shipping containers is smaller than the total number of shipping containers necessary to fulfill the order.

Therefore, goods are "ready for packing" whenever they fulfill the above condition, i.e. are sufficient to fill a predefinable number of shipping containers. The check for goods ready for packing is carried out by a buffer-control computer, in particular by a program running within it.

The object of the invention is also achieved with a goods storage system of the kind mentioned at the beginning, additionally comprising
  a buffer-control computer configured to verify whether a portion of the order goods available in the dynamic buffer which are allocated to the order is sufficient to fill a predefinable number of shipping containers and is therefore ready for packing and
  which is also configured to trigger the discharge of this portion of order goods ready for packing from the dynamic buffer and the transport to the picking workstation, wherein the predefined number of shipping containers is smaller than the total number of shipping containers necessary to fulfill the order.

In particular, the conveying device connects the dynamic buffer to the store and to the picking workstation. This means that the conveying device is adapted to transport order goods from the store to the dynamic buffer and from the dynamic buffer to the picking workstation. Along the route of the conveying device, further means of the goods storage system may be provided, for example repacking stations for repacking the order goods coming from the store onto loading aids, and/or a sorting machine.

Due to the fact that, compared with the prior art, the number of order goods required for forming a portion ready for packing (i.e. "qualifying order goods") is reduced considerably, the dynamic buffer can be operated particularly efficiently. For one thing, the probability of a portion ready for packing occupying only one single buffer lane is high, whereby the discharge of the order goods from the dynamic buffer is facilitated significantly. This leads to desired, largely continuous flows of conveyed goods within the goods storage system. These flows of conveyed goods are also more efficient, i.e. they have a high degree of order and/or a high degree of sorting within the flow. In addition, short buffer lanes are more energy efficient, as the probability of order goods not belonging to a portion ready for packing (i.e. "non-qualifying order goods") being moved decreases, as does the share of energy required for the inherently unnecessary movement of non-qualifying order goods.

Also, due to the relatively small size of a portion of order goods ready for packing, the dwell time of the order goods in the dynamic buffer is only very short. Therefore, only relatively small dynamic buffers are required for operating the goods storage system. Also sorting means connected to the dynamic buffer (for example a presorting buffer connected to the dynamic buffer or a sorting stage downstream of the dynamic buffer) can be kept relatively small. As a consequence, the dynamic buffer as well as optional sorting means are relatively easy to integrate into the structure of a goods storage system.

Finally, the dynamic buffer can also be built with a favorable length-to-width ratio and/or with a favorable length-to-height ratio, as the object of storing temporarily a portion ready for packing in one single buffer lane, if possible, can be achieved with a plurality of possible embodiments of a dynamic buffer. This means that the engineer of a goods storage system has much flexibility with regard to the design of the dynamic buffer. As a consequence, the dynamic buffers are also relatively easy to integrate into the structure of goods storage systems.

In contrast to this, the batch buffers from the prior art, as a rule, have very long buffer lanes and thus a rather unfavorable length-to-width ratio and/or a rather unfavorable length-to-height ratio, due to the object of storing temporarily a complete order in one single buffer lane, if possible. As a consequence, the known dynamic buffers are relatively hard to integrate into the structure of a goods storage system.

A characteristic of a "dynamic buffer" is the return lane arranged between the outfeed line and the infeed line. In contrast to this, "static buffers" have no return lane arranged between the outfeed line and the infeed line but only a plurality of buffer lanes arranged between the infeed line and the outfeed line.

It should also be noted in this context that the goods storage system can, of course, process a plurality of orders simultaneously. This means that order goods of a plurality of orders can be picked simultaneously. It is therefore favorable if further goods which are located between the order goods of the portion ready for packing in the buffer lane in which the portion of the order goods ready for packing is stored temporarily are returned, upon the discharge of the portion ready for packing from the dynamic buffer, via the return lane to the dynamic buffer.

In other words, further goods are located between the order goods of the portion ready for packing in the buffer lane in which the portion of the order goods ready for packing is stored temporarily, and these further goods are returned, upon the discharge of the portion ready for packing from the dynamic buffer, via the return lane to the dynamic buffer. This increases the degree of order of the order goods located in the dynamic buffer.

Order goods ready for packing (i.e. order goods belonging to the portion ready for packing) are, as mentioned, referred to as "qualifying order goods." Order goods not yet ready for packing, in contrast, are also referred to as "non-qualifying order goods."

The store can be operated in an automated manner. In this case, a goods manipulator is provided in the area of the store, which is configured to remove order goods from the store. The goods manipulator can in particular be configured as a single-level storage-and-retrieval unit or multi-level storage-and-retrieval unit. In principle, the order goods can also be removed manually, for example directly by hand or with the help of a manually-operated forklift truck. A goods manipulator will then be obsolete. The store can generally be configured as a supply store and/or as store for returned goods.

It should furthermore be noted that while, as a rule, a plurality of order goods is accommodated in a shipping container, it may, in principle, also be the case that only one (single) order good is accommodated by a shipping container. Similarly, it may be the case that one shipping container is provisioned at a picking workstation or that a plurality of shipping containers per picking workstation is provisioned.

Other advantageous designs and further developments of the invention become apparent from the dependent claims as well as from the description in combination with the figures.

It is advantageous if the predefined number of shipping containers for forming a portion of order goods ready for packing is exactly one. In this way, the dynamic buffer is quickly emptied again.

However, it is also advantageous if the predefined number of shipping containers for forming a portion of order goods ready for packing is larger than one. In this way, a larger number of order goods is removed from the dynamic buffer at once, whereby the subsequent handling of the flow of conveyed goods is facilitated under certain circumstances. This procedure is particularly advantageous in the context of a sorting stage downstream of the dynamic buffer, which can be operated in an optimal manner using the proposed procedure.

It is furthermore favorable if the order goods are repacked into loading aids after the removal from the store and before the transport to the dynamic buffer. In this way, non-transportable goods or goods which are difficult to transport can be made transportable. Moreover, the use of loading aids enables an operation of the goods storage system with a low proneness to failure. The goods can, of course, be stored in loading aids also in the store, either in the same loading aids that are used in the dynamic buffer or in other loading aids (in particular in cartons). In particular hanging bags, containers (in particular cases or boxes) or trays qualify as loading aids. A hanging bag is known, for example, from EP 3 090 967 A2. A hanging bag is generally very space-saving and provides good protection for the good(s) located therein.

It is also advantageous if
the order goods in the dynamic buffer are stored temporarily in loading aids and
a loading aid contains exactly one order good.

In this way, the order goods can be picked in a particularly flexible manner.

Moreover, it is advantageous if
the order goods in the dynamic buffer are stored temporarily in loading aids and
a loading aid contains more than one order good.

In this way, the dynamic buffer can be designed even smaller, as the order goods are stored temporarily therein in higher density.

It is furthermore advantageous if
the order goods are allocated to at least one class of goods on the basis of their properties and
a shipping container is filled only with order goods of a single class of goods.

In this way, the handling and in particular a storing of the order goods at a destination which the shipping containers reach after the shipping is facilitated. The destination can, for example, be a commercial store where the goods are offered to end customers. The shipping containers can be filled in such a way that they can be allocated to specific floors and/or departments of this commercial store, whereby, for example, a sorting and putting away of the goods offered for sale is facilitated.

However, it is also advantageous if
the order goods are allocated to at least one class of goods on the basis of their properties and
a shipping container is filled with order goods of a plurality of classes of goods.

In this way, the shipping containers can be filled up completely, even if the number of order goods of a class of goods were insufficient to do so.

In another favorable variant embodiment, the order goods comprise items of clothing and the properties for forming a class of goods relate to a color of the item of clothing and/or a type of the item of clothing and/or a size of the item of clothing. A type of the item of clothing may for example relate to the distinction according to color, the distinction between top/blouse/shirt, patterned/unicolor, women/men/unisex, etc. Evidently, also combinations of said properties are possible.

It is favorable if the allocation of an order good to a shipping container is done before the temporary storing of the order good in the dynamic buffer. In this way, the order picking process runs in a relatively deterministic manner. For example, an allocation of an order good to a specific shipping container can be done as early as upon (or even before) removal. The order picking process is therefore easily plannable.

However, it is also favorable if the allocation of an order good to a shipping container is done before the discharge of the order goods from the dynamic buffer. In this way, the part of the order picking process which is downstream of the dynamic buffer and, at least in part, also the part of the order picking process running within the dynamic buffer is done in a relatively deterministic manner. These parts of the order picking process are therefore easily plannable. In particular, the allocation of an order good to a shipping container is done during the temporary storing of the order good in the dynamic buffer.

Finally, it is also favorable if the allocation of an order good to a shipping container is done after the discharge of the order goods from the dynamic buffer. The order picking process is therefore particularly flexible, as the allocation of an order good to a specific shipping container is done at a relatively late point in time and it is therefore possible to intervene correctively in the order picking process at a relatively late point in time as well.

It is furthermore advantageous if a sorting stage is provided between the dynamic buffer and the picking workstation, which sorting stage is adapted to create a sequence of the order goods as desired at the picking workstation. Accordingly, a method is of advantage in which
the order goods allocated to the order are transported to the dynamic buffer unsorted and are stored temporarily in the at least one buffer lane of the dynamic buffer and
the order goods pass through a sorting stage (in particular a matrix sorter) after the discharge from the dynamic buffer and before the arrival at the picking workstation, in which sorting stage a sequence of the order goods as desired at the picking workstation is created.

This means that the order goods allocated to the order do not yet have the sequence as desired at the picking workstation during the transport to the dynamic buffer. In this way, the transport of the order goods to the dynamic buffer and in particular the removal of the order goods from the store and/or also a repacking of the order goods into a loading aid can be done in a relatively flexible manner, as no particular sequence must be observed here. This sequence is created only in a sorting stage subsequent to the dynamic buffer. In particular, the sorting stage works on the basis of a radix algorithm. Such sorting stages are also known as "matrix sorters." In particular, such a matrix sorter has three levels with six lanes each.

In principle, however, it would also be conceivable for the order goods allocated to the order to be transported to the dynamic buffer sorted (with regard to the order) and be stored temporarily in the at least one buffer lane of the dynamic buffer. This means that order goods of an order are then transported to the dynamic buffer in a sequence as desired at the picking workstation and are stored temporarily in the at least one buffer lane of the dynamic buffer. The operation of passing through a sorting stage downstream of the dynamic buffer will then be obsolete.

In another advantageous design, the goods storage system comprises a presorting buffer connected to the dynamic buffer, which presorting buffer has a plurality of return lanes and is adapted to group order goods of a plurality of orders/shipping containers/classes of goods on the basis of the orders/shipping containers/classes of goods. In particular, in this context a method is of advantage in which
a) one order good each is allocated to one order each, wherein
the order goods of a plurality of orders are transported to the dynamic buffer intermixed and are stored temporarily in the at least one buffer lane of the dynamic buffer and
the order goods of a plurality of orders are transported from the dynamic buffer into a presorting buffer connected to the dynamic buffer and are grouped there on the basis of the orders or
b) one order good each is allocated to one shipping container each, wherein
the order goods of a plurality of shipping containers are transported to the dynamic buffer intermixed and are stored temporarily in the at least one buffer lane of the dynamic buffer and the order goods of a plurality of shipping containers are transported from the dynamic buffer into a presorting buffer connected to the dynamic buffer and are grouped there on the basis of the shipping containers or b) one order good is allocated to one class of goods, wherein the order goods of a plurality of classes of goods are transported to the dynamic buffer intermixed and are stored temporarily in the at least one buffer lane of the dynamic buffer and the order goods of a plurality of classes of goods are transported from the dynamic buffer into a presorting buffer connected to the dynamic buffer and are grouped there on the basis of the classes of goods.

In other words, the method described is a method for picking order goods, in which a plurality of allocation units of the same kind is provided, one order good each is allocated to an allocation unit, the order goods of a plurality of allocation units are transported to the dynamic buffer intermixed and are stored temporarily in the at least one buffer lane of the dynamic buffer and the order goods of a plurality of allocation units are transported from the dynamic buffer into a presorting buffer connected to, in particular upstream of, the dynamic buffer and are grouped there on the basis of the allocation units, and a mixing of the allocation units is undone, wherein an order or a shipping container or a class of goods is provided as a kind of the allocation units and an order or a shipping container or a class of goods is provided as an allocation unit.

This means that order goods of a plurality of orders/shipping containers/classes of goods are transported to the dynamic buffer intermixed and are stored in the at least one buffer lane of the dynamic buffer. Therefore, directly consecutive order goods in the infeed line of the dynamic buffer form order goods of not only one single order/one single shipping container/one single class of goods. The grouping and/or the formation of "clusters" on the basis of the orders/shipping containers/classes of goods is instead done at a later point in time in the presorting buffer. This formation of groups or clusters is of advantage for the procedure for the subsequent part of the order picking process, in particular for the packing of the order goods. As the order goods are grouped in the presorting buffer, the presorting buffer can also be regarded as a "grouping buffer." For the sake of completeness, it should also be noted that the allocation of one order good to one shipping container each has already been done before a method in accordance with item b) is carried out.

The proposed method increases the degree of order of the order goods stored temporarily in the dynamic buffer. In the optimal case, a mixing of different orders/shipping containers/classes of goods no longer takes place at all. However, it is also conceivable that order goods of different orders/shipping containers/classes of goods are mixed to a small degree even after passing through the presorting buffer. If required, the presorting buffer can also be passed through a plurality of times in order to increase the degree of order in the dynamic buffer step by step.

Generally, the presorting buffer may be understood as being part of the dynamic buffer. In this case, the dynamic buffer has not only one return lane but a plurality of return lanes, at least some of which are used for sorting the order goods.

In principle, it would also be conceivable for the order goods to be transported to the dynamic buffer sorted with regard to a plurality of orders/shipping containers/classes of goods and be stored temporarily in the at least one buffer lane of the dynamic buffer. This means that order goods of a plurality of orders/shipping containers/classes of goods are transported to the dynamic buffer grouped on the basis of the orders/shipping containers/classes of goods and stored temporarily in the at least one buffer lane of the dynamic buffer. Specifically, therefore, a method is of advantage in which a) one order good each is allocated to one order each and the order goods of a plurality of orders are transported to the dynamic buffer grouped according to orders and are stored temporarily in the at least one buffer lane of the dynamic buffer or b) one order good each is allocated to one shipping container each and the order goods of a plurality of shipping containers are transported to the dynamic buffer grouped according to shipping containers and are stored temporarily in the at least one buffer lane of the dynamic buffer or c) one order good is allocated to one class of goods, wherein order goods of a plurality of classes of goods are transported to the dynamic buffer grouped according to classes of goods and are stored temporarily in the at least one buffer lane of the dynamic buffer.

The passing through a presorting buffer connected to the dynamic buffer will then be obsolete.

In the context of the grouping of order goods it is also of advantage if i) there is a combination of the cases a) and b) for order goods and a grouping on the basis of the shipping containers is done within the grouping on the basis of the orders or ii) there is a combination of the cases a) and c) for order goods and a grouping on the basis of the classes of goods is done within the grouping on the basis of the orders or iii) there is a combination of the cases b) and c) for order goods and a grouping on the basis of the classes of goods is done within the grouping on the basis of the shipping containers or vice versa or iv) there is a combination of the cases a) and b) and c) for order goods and a grouping on the basis of the shipping containers is done within the grouping on the basis of the orders and a grouping on the basis of the classes of goods is done within the grouping on the basis of the shipping containers or v) there is a combination of the cases a) and b) and c) for order goods and a grouping on the basis of the classes of goods is done within the grouping on the basis of the orders and a grouping on the basis of the shipping containers is done within the grouping on the basis of the classes of goods.

In other words, the method described is a method in which a plurality of kinds of allocation units is provided, one order good each is allocated to one allocation unit of a kind and the grouping in the presorting buffer is done on the basis of a kind of allocation units and, as part of this grouping, on the basis of another kind of allocation units.

In this way, the degree of order in the flow of the order goods is increased further, whereby the procedure for the subsequent part of the order picking process, in particular for the packing of the order goods, is improved even further.

It is also particularly advantageous if a probability and/or a time needed for forming a portion ready for packing is precalculated for different combinations of order goods and those order goods for which the formation of a portion ready for packing is most probable and/or requires the least amount of time is transported to the dynamic buffer first. In this way, the picking performance of the goods storage system is particularly high. In particular, the dwell time of the order goods in the dynamic buffer is only short, and the dynamic buffer can be configured particularly small.

Moreover, it is also advantageous if, for the qualification of order goods as a portion ready for packing, it is checked additionally whether one or a plurality of the following conditions applies:

I) the order goods of the portion ready for packing have a higher priority with regard to time than other order goods of another portion ready for packing and/or II) the size of the portion ready for packing is larger than another portion ready for packing and/or III) a grouping on the basis of an order/shipping containers/classes of goods has already been done.

This means that additional conditions for the discharge of the portion of the order goods ready for packing from the dynamic buffer and for the transport to the picking workstation are checked. In case I), urgent orders are processed preferentially. In case II), it will be ensured that the dynamic buffer is emptied as thoroughly as possible. In case III), it is finally ensured that a grouping, which is under certain circumstances required for the subsequent packing of the order goods, has already been done and does not have to be created first, for example by an operation of passing through the presorting buffer.

It is furthermore favorable if exactly one presorting buffer is allocated to one dynamic buffer. In this way, the course of the procedure of forming groups is particularly simple, and there are no blockades between a plurality of dynamic buffers.

However, it is also favorable if a plurality of presorting buffers is allocated to one dynamic buffer. In this way, a particularly high sorting performance is available for the dynamic buffer.

Finally it is also favorable if one presorting buffer is allocated to a plurality of dynamic buffers. In this way, the goods storage system needs relatively little space overall.

Generally, it is also particularly advantageous if a ratio between a total number $n_1$ of return lanes of the at least one presorting buffer provided in the goods storage system and a total number $n_2$ of buffer lanes of the at least one dynamic buffer provided in the goods storage system is $$\frac{n_1}{n_2} = \frac{ta \cdot p \cdot m_1 \cdot f \cdot c_2 \cdot x}{c_1 \cdot b}$$

Here, ta is a transport time required on average by an order good to travel from the dynamic buffer to the presorting buffer, p is a number of order goods to be provisioned by the presorting buffer per unit of time, $c_1$ is a number of order goods storable in a return lane of the presorting buffer, $m_1$ is a total number of the presorting buffers comprised by the goods storage system, b is a number of order goods storable temporarily in the dynamic buffer at the same time, f is an average filling ratio of the buffer lanes of the dynamic buffer and $c_2$ is a number of order goods storable in a buffer lane of the dynamic buffer.

A value of 1.5 is selected for x if the last order good of the order passing an exit of the dynamic buffer triggers the removal of further order goods, and a value of 2.0 is selected for x if the last order good of the order passing an entry of the presorting buffer triggers the removal of further order goods. Otherwise, a value therebetween is selected.

The parameter ta can also be regarded or referred to as access time, p as process performance, $c_1$ as lane capacity of the presorting buffer, b as batch size, $c_2$ as lane capacity of the dynamic buffer and x as sequence point factor.

The batch size b is also a measure for a number of order goods of the groups of orders simultaneously processed in the goods storage system. The average filling ratio f of the buffer lanes of the dynamic buffer specifies the share of the buffer lanes (as a percentage) occupied by order goods over the averaged time period. The share short of 100% is thus empty and/or not occupied by order goods over the averaged time period.

The sequence point factor x takes into account how soon after registering a need for a replenishment of goods from the dynamic buffer into the presorting buffer, this required replenishment is triggered and/or is actually done. If the sequence point is located at the entry of the presorting buffer, the value 2.0 is selected for the sequence point factor x. If the sequence point is located at the exit of the dynamic buffer, the value 1.5 is selected for the sequence point factor x. If the sequence point is located between the exit of the dynamic buffer and the entry of the presorting buffer, a representative value (i.e. a value interpolated linearly) between 1.5 and 2.0 is selected for the sequence point factor x.

The formula for the ratio between the total number $n_1$ of return lanes of presorting buffers provided in the goods storage system and the total number $n_2$ of buffer lanes of dynamic buffers provided in the goods storage system can also be referred to the number of loading aids instead of the number of the order goods. In this case, instead of the number of the order goods the average filling level of the loading aids with order goods is to be used in the specified formula. Here, it is irrelevant whether all loading aids contain the same quantity of order goods or whether the loading aids accommodate different quantities of order goods.

In this case, the ratio between a total number $n_1$ of return lanes of the at least one presorting buffer provided in the goods storage system and a total number $n_2$ of buffer lanes of the at least one dynamic buffer provided in the goods storage system is $$\frac{n_1}{n_2} = \frac{ta \cdot p \cdot m_1 \cdot f \cdot c_2 \cdot x}{c_1 \cdot b}$$

wherein ta is a transport time required on average by a loading aid to travel from the dynamic buffer to the presorting buffer, p is a number of loading aids to be provisioned by the presorting buffer per unit of time, $c_1$ is a number of loading aids storable in a return lane of the presorting buffer, $m_1$ is a total number of the presorting buffers comprised by the goods storage system, b is a number of loading aids storable temporarily in the dynamic buffer at the same time, f is an average filling ratio of the buffer lanes of the dynamic buffer and $c_2$ is a number of loading aids storable in a buffer lane of the dynamic buffer.

A value of 1.5 is selected for x if the last loading aid of the order passing an exit of the dynamic buffer triggers the removal of further loading aids, and a value of 2.0 is selected for x if the last loading aid of the order passing an entry of the presorting buffer triggers the removal of further loading aids. Otherwise, a value therebetween is selected.

Generally, the measures proposed result in the presorting buffers being very small compared with the dynamic buffers. In other words, the presorting buffer accounts for only a small share of the total storage capacity, which is formed by the combination of the dynamic buffer and the presorting buffer allocated to it. In this way, the storage capacity in the goods storage system is particularly high.

The above-mentioned formula refers to the ratio between the total number $n_1$ of return lanes of the presorting buffers provided in the goods storage system and the total number $n_2$ of buffer lanes of the dynamic buffers provided in the goods storage system.

However, it is also advantageous if exactly one presorting buffer is allocated to one dynamic buffer and the ratio between the number $n_1$ of return lanes of the presorting buffer and the number $n_2$ of buffer lanes of a dynamic buffer allocated to this presorting buffer is calculated according to the following formula:

$$\frac{n_1}{n_2} = \frac{ta \cdot p \cdot f \cdot c_2 \cdot x}{c_1 \cdot b}$$

It is further advantageous if a plurality of presorting buffers is allocated to one dynamic buffer and the ratio between the total number $n_1$ of return lanes of the presorting buffers and the number $n_2$ of buffer lanes of the dynamic buffer allocated to these presorting buffers is calculated according to the following formula:

$$\frac{n_1}{n_2} = \frac{ta \cdot p \cdot m_1 \cdot f \cdot c_2 \cdot x}{c_1 \cdot b}$$

Finally, it is also advantageous if exactly one presorting buffer is allocated to a plurality of dynamic buffers and the ratio between the number $n_1$ of return lanes of the presorting buffer and the total number $n_2$ of buffer lanes of the dynamic buffers allocated to this presorting buffer is calculated according to the following formula:

$$\frac{n_1}{n_2} = \frac{ta \cdot p \cdot f \cdot c_2 \cdot x}{c_1 \cdot b \cdot m_2}$$

wherein the parameter $m_2$ corresponds to a total number of the dynamic buffers comprised by the goods storage system.

For the purpose of a better understanding of the invention, the latter will be elucidated in more detail by means of the figures below.

Figure 2:
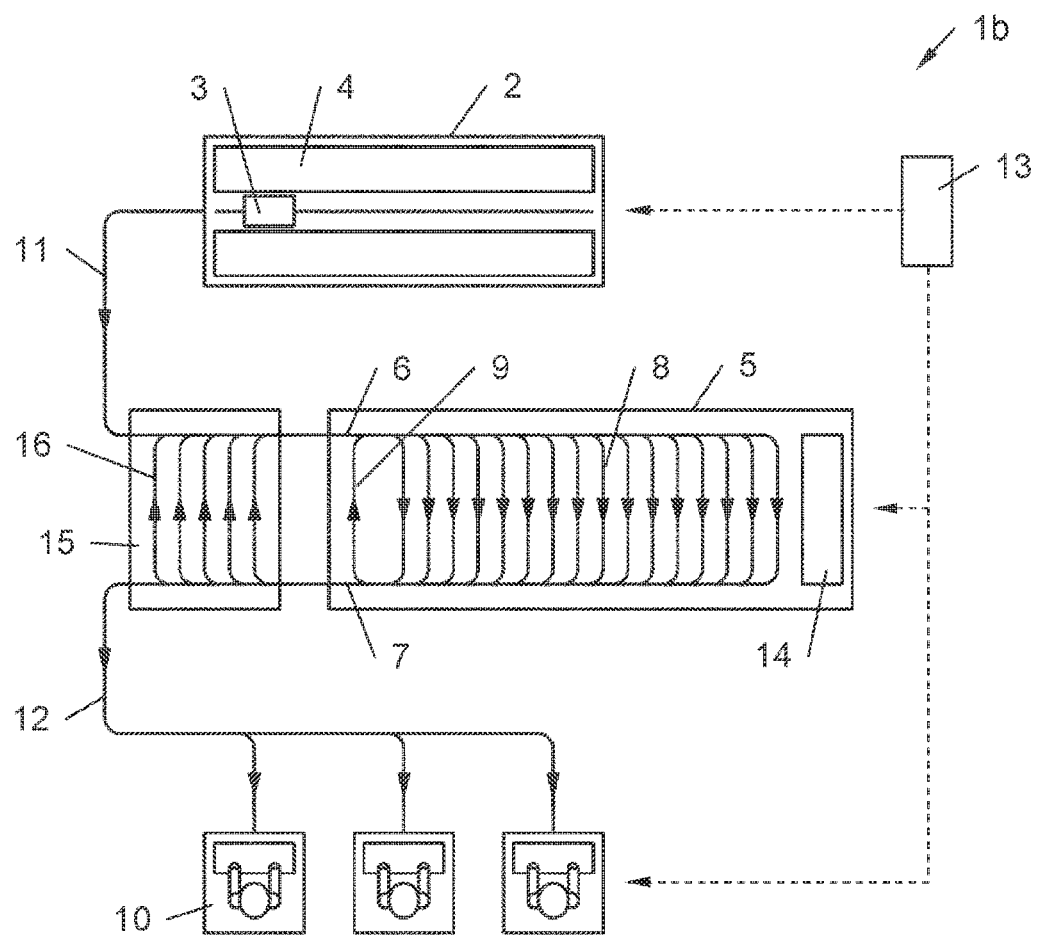
Figure 3:
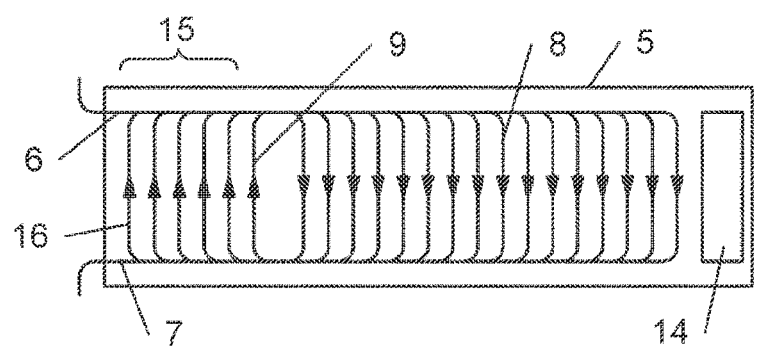
Figure 4:
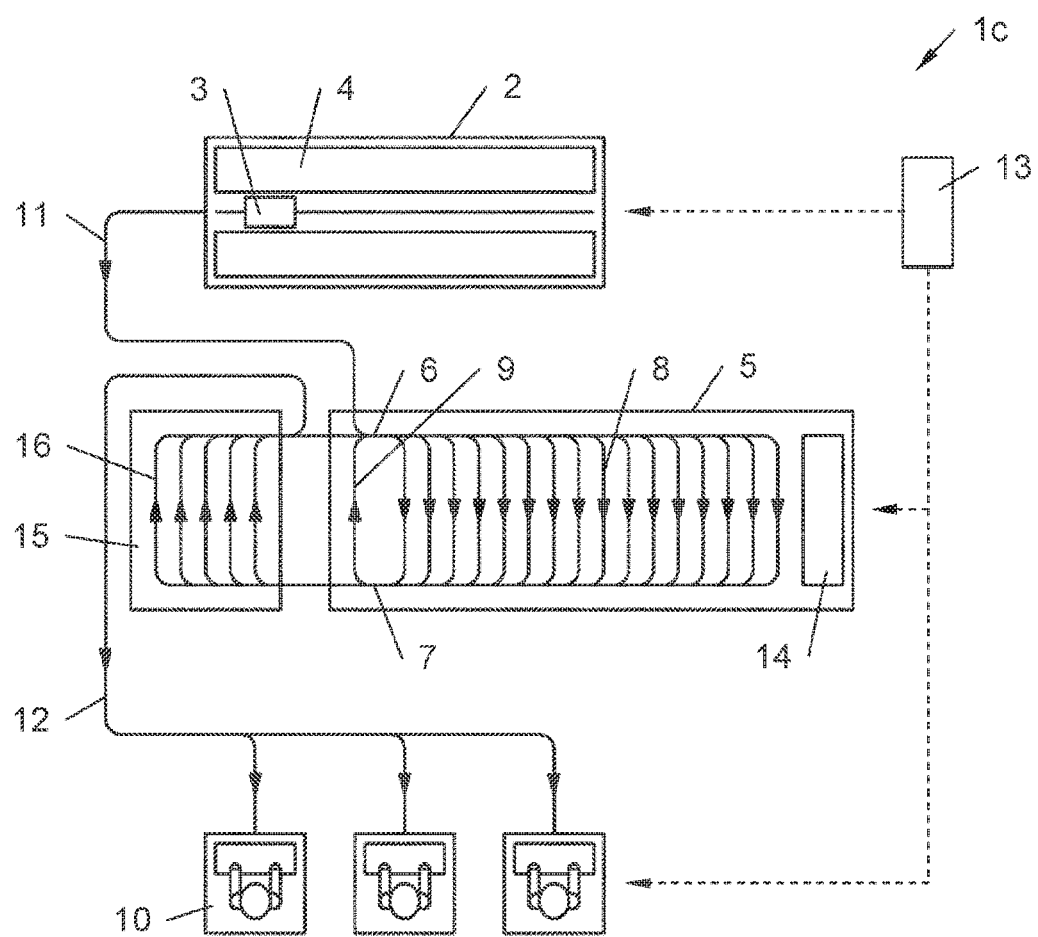
Figure 5:
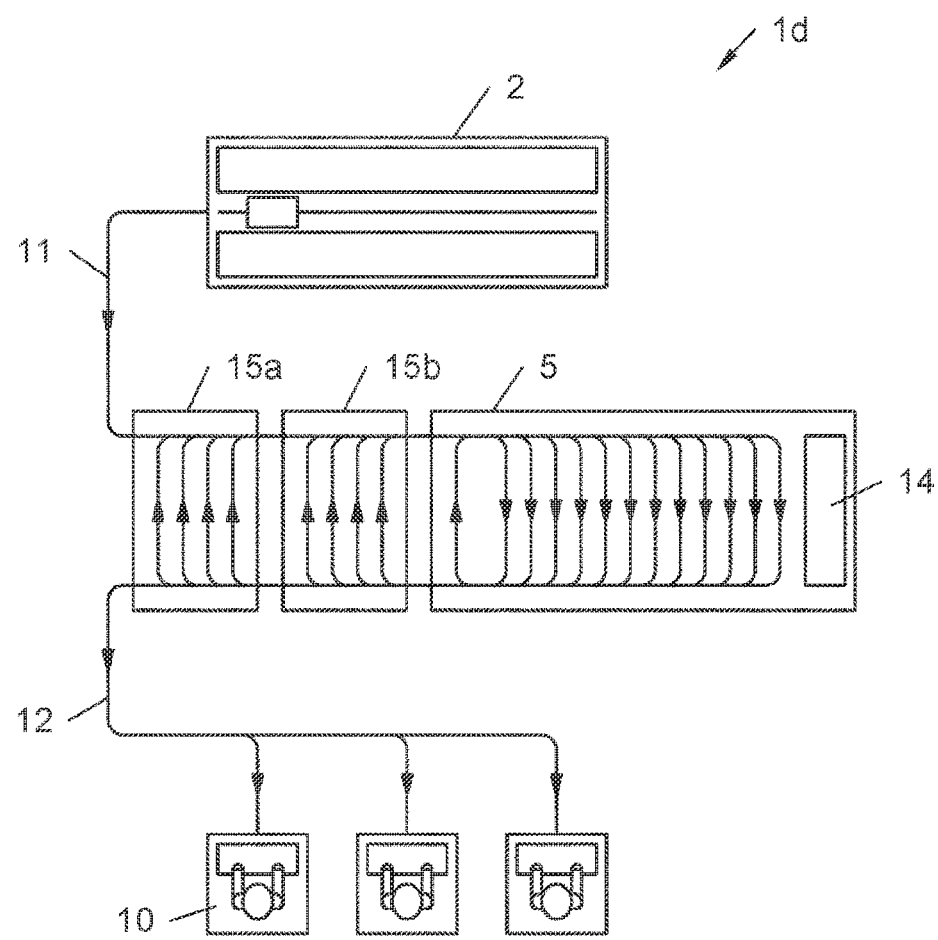
Figure 6:
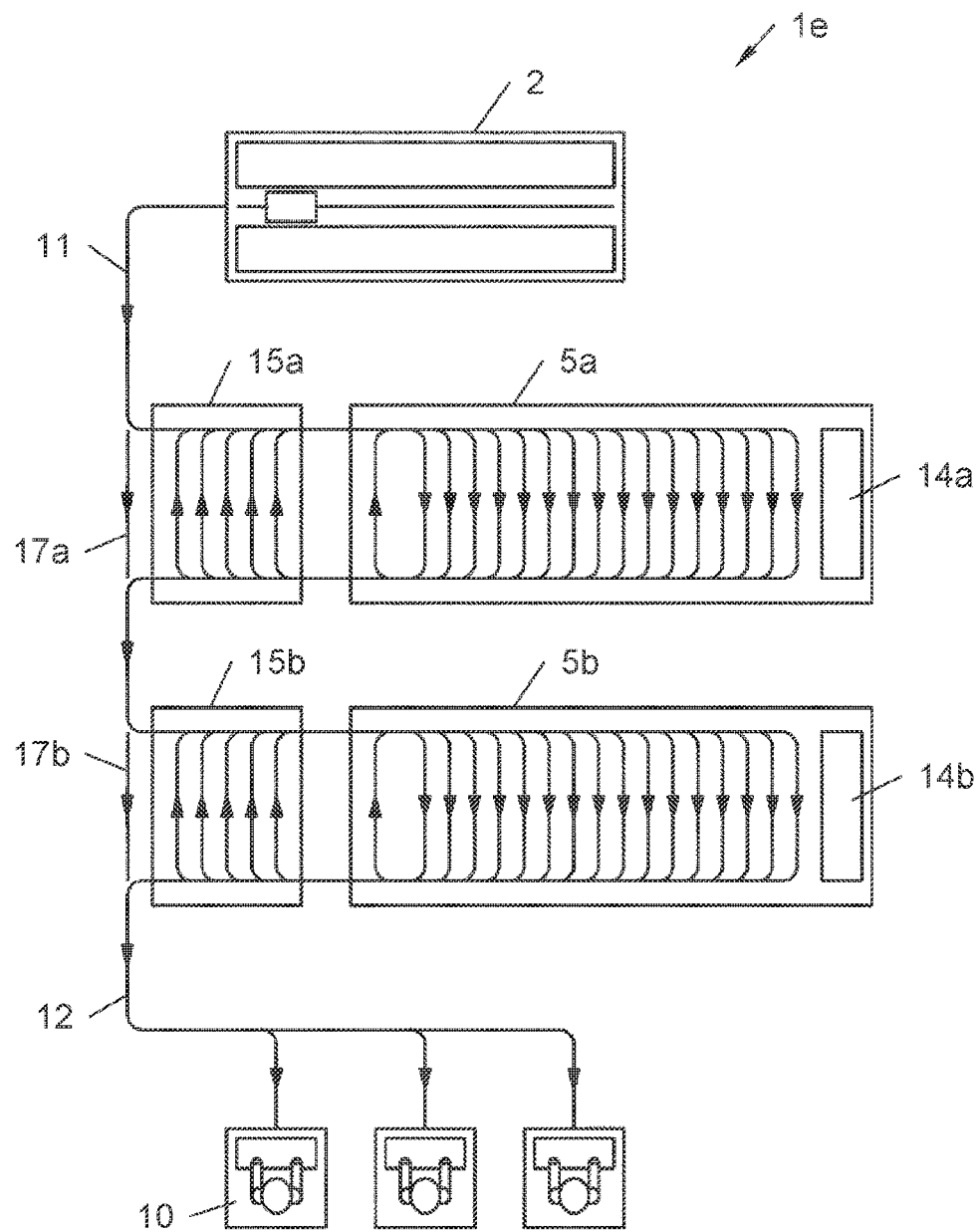
Figure 7:
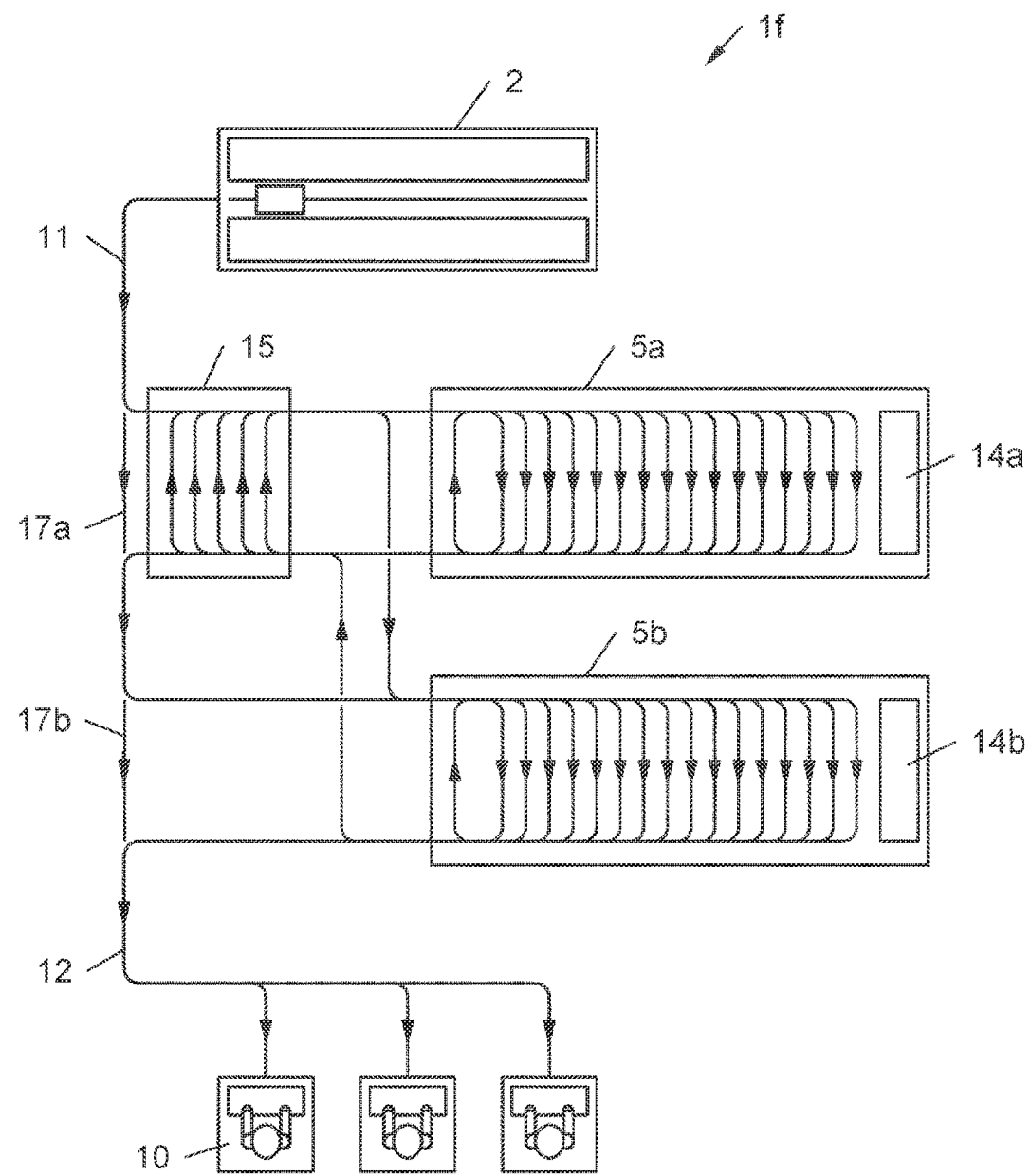
Figure 8:
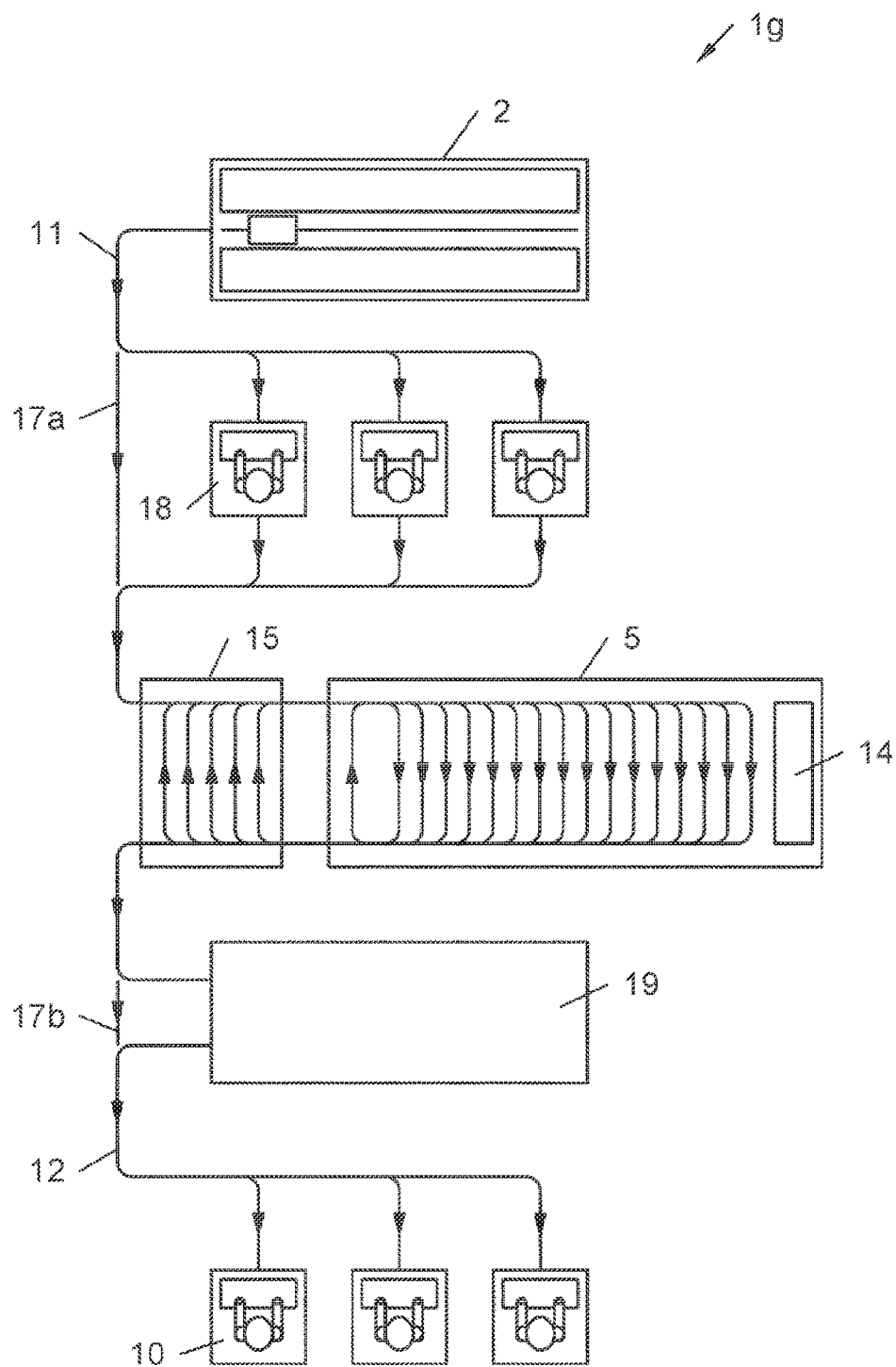

In a strongly simplified, schematic depiction, each figure shows as follows:

FIG. 1 a first schematic depiction of an exemplary goods storage system;

FIG. 2 as FIG. 1, only with a presorting buffer connected to the dynamic buffer;

FIG. 3 a depiction of a presorting buffer integrated in the dynamic buffer;

FIG. 4 as FIG. 2, only with different connections of the conveying device to the presorting buffer and to the dynamic buffer;

FIG. 5 a schematic depiction of an exemplary goods storage system having two presorting buffers allocated to one dynamic buffer;

FIG. 6 another variant of a goods storage system having two dynamic buffers and two presorting buffers;

FIG. 7 a variant of a goods storage system having two dynamic buffers with one presorting buffer and FIG. 8 a schematic depiction of an exemplary goods storage system having a sorting stage downstream of the dynamic buffer and a plurality of repacking stations upstream of the dynamic buffer.

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, and these specifications of location are to be analogously transferred to the new position.

FIG. 1 shows a first example of a goods storage system 1*a* for picking order goods allocated to at least one order, which order comprises a plurality of shipping containers. The goods storage system 1*a* comprises a store 2 in which the order goods are storable. In this example, the store 2 is operated in an automated manner and comprises, to that end, a goods manipulator 3 configured to remove order goods from store racks 4. The goods manipulator 3 can in particular be configured as a single-level storage-and-retrieval unit or multi-level storage-and-retrieval unit. The structure of an automated store 2 is known in principle and is therefore not explained in detail. While the use of an automated store 2 is of advantage, the order goods can, in principle, also be removed manually, for example directly by hand or with the help of a manually-operated forklift truck. A goods manipulator 3 will then be obsolete. The store 2 can generally be configured as a supply store and/or as store for returned goods.

Furthermore, the goods storage system 1*a* comprises a dynamic buffer 5, which is in particular operated in an automated manner, and an infeed line 6 and an outfeed line 7, a plurality of buffer lanes 8 arranged between the infeed line 6 and the outfeed line 7 as well as at least one return lane 9 arranged between the outfeed line 7 and the infeed line 6.

In addition, the goods storage system 1*a* comprises a picking workstation 10 (in this case specifically three picking stations 10) for filling a shipping container provisioned at the picking workstation 10 with at least one order good as well as a conveying device 11 adapted for the transport of order goods from the store 2 to the dynamic buffer 5 and a conveying device 12 adapted for the transport of order goods from the dynamic buffer 5 to the picking workstation 10. The order picking process itself can be done in an automated, manual or a mix of automated and manual manner.

An order computer 13 of the goods storage system 1*a* serves to acquire an order and is in this example connected to the store 2, the dynamic buffer 5 and the picking workstation 10 in terms of control technology, which is indicated by dashed lines.

Finally, the goods storage system 1a has a buffer-control computer 14, which is configured to check whether a portion of the order goods available in the dynamic buffer 5, which order goods are allocated to the order, is sufficient to fill a predefinable number of shipping containers and is therefore ready for packing. The buffer-control computer 14 is furthermore configured to trigger the discharge of this portion of order goods ready for packing from the dynamic buffer 5 and the transport to the picking workstation 10. The predefined number of shipping containers is smaller here than the total number of shipping containers necessary to fulfill the order. The buffer-control computer 14 is not necessarily autonomous but may, for example, also be part of the order computer 13 or of another control means in the goods storage system 1a.

The functioning of the device 1a depicted in the FIG. 1 is as follows:

In a first step, an order is acquired by the order computer 13 of the goods storage system 1a. The order may, for example, relate to a delivery of a plurality of goods to a wholesaler, trade intermediary or to a commercial store and be transmitted, in a manner known in principle, in particular electronically, to the goods storage system 1a. The respective order may in particular be one of a plurality of orders processed, in particular simultaneously, in the goods storage system 1a.

In another step, the order goods allocated to the order are removed from the store 2, transported to the dynamic buffer 5 using the conveying device 11 and stored temporarily in at least one buffer lane 8 of the dynamic buffer 5.

The buffer-control computer 14 is used to check (continuously) whether a portion of the order goods available in the dynamic buffer 5 is sufficient to fill a predefinable number of shipping containers and is therefore ready for packing. If this is the case, the portion of the order goods ready for packing is discharged from the dynamic buffer 5, transported to the picking workstations 10 using the conveyor mechanism 12 and transferred, there, into the predefined number of shipping containers. The predefined number of shipping containers is smaller here than the total number of shipping container necessary to fulfill the order. However, for the sake of completeness, it should be noted that orders requiring only one shipping container to accommodate all goods allocated to the order can evidently also be processed in the goods storage system 1a.

In the proposed system, therefore, it is not necessary to wait until all order goods of an order are available in the dynamic buffer 5, but it is merely required that a certain number of shipping containers is ready to accommodate order goods.

In particular, the predefined number of shipping containers for forming a portion of order goods ready for packing may be exactly one. In this way, the dynamic buffer 5 is quickly emptied again.

Accordingly, a first portion of the order goods ready for packing is discharged from the dynamic buffer 5, transported to the picking workstation 10 and repacked, there, into the first shipping container as early as when said first portion of the order goods ready for packing is available in the dynamic buffer 5, even if not all order goods are available yet in the dynamic buffer 5 to fulfill the order (completely). Subsequently, a second portion of the order goods ready for packing is discharged from the dynamic buffer 5, transported to the picking workstation 10 and repacked, there, into the second shipping container as early as when said second portion of the order goods ready for packing is available in the dynamic buffer 5, even if not all order goods are available yet in the dynamic buffer 5 to fulfill the order (completely), and so forth.

Accordingly, it may be provided to supply the second portion of the order goods ready for packing to the dynamic buffer 5 only when the first portion of the order goods ready for packing has already been discharged from the dynamic buffer 5. However, it is also conceivable in principle that the second portion of the order goods ready for packing is already available in the dynamic buffer 5 when the first portion of the order goods ready for packing is discharged from the dynamic buffer 5. It is also particularly advantageous if order goods are transported into the dynamic buffer 5 (continuously and) independent of the discharge of a portion of the order goods ready for packing from the dynamic buffer 5.

The repacking into shipping containers can be done in aggregate form, i.e. the first shipping container does not have to be loaded immediately after the removal of the first portion of the order goods ready for packing, but the loading of the first shipping container may be delayed until such point in time as also a second portion (or further portions yet) is/are available at the picking workstation and therefore a second shipping container can be loaded. In this case, it is particularly advantageous if an intermediate store for the portions of the order goods not yet repacked into the shipping containers and/or an intermediate store for the shipping containers is arranged at the picking workstation.

It should also be noted that the portion of the order goods ready for packing may also be formed by exactly one piece of good.

However, the predefined number of shipping containers may also be larger than one. In this way, a larger number of order goods is removed from the dynamic buffer 5 at once, whereby the subsequent handling of the flow of conveyed goods is facilitated under certain circumstances. This procedure is particularly advantageous in the context of a sorting stage downstream of the dynamic buffer 5, which can be operated in an optimal manner using the proposed procedure (in this context see also FIG. 8).

Due to the relatively small size of a portion of order goods ready for packing, the dwell time of the order goods in the dynamic buffer 5 is only very short. Therefore, only relatively small dynamic buffers 5 are necessary to operate the goods storage system 1a. Also, due to the fact that, compared with the prior art, the number of order goods required for forming a portion ready for packing (i.e. "qualifying order goods") is reduced considerably, the dynamic buffer 5 can be operated particularly efficiently. For example, the probability of a portion ready for packing occupying only one single buffer lane 8 is high, whereby the discharge of the order goods from the dynamic buffer 5 is facilitated significantly. This leads to desired, largely continuous flows of conveyed goods within the goods storage system 1a (without further measures). These flows of conveyed goods are also more efficient, i.e. they have a high degree of order and/or a high degree of sorting within the flow.

It is generally an object to store temporarily a portion ready for packing in one single buffer lane 8, if possible. This object can be achieved with a plurality of possible embodiments of a dynamic buffer 5, in particular with a plurality of length-to-width ratios and/or with a plurality of length-to-height ratios, depending on the dimensions of the dynamic buffer 5. This means that the engineer of a goods storage system 1a has much flexibility with regard to the design of the dynamic buffer 5. As a consequence, the dynamic buffer 5 is relatively easy to integrate into the structure of a goods storage system 1a.

Said object can in particular also be achieved with short buffer lanes 8. Short buffer lanes 8 are more energy efficient, as the probability of order goods not belonging to a portion ready for packing (i.e. "non-qualifying order goods") to be moved decreases, as does the share of energy required for the inherently unnecessary movement of non-qualifying order goods.

Without further measures, the object of storing order goods grouped in the dynamic buffer 5, i.e. of directly subsequent order goods at the infeed line 6 of the dynamic buffer 5 forming only order goods of one single order, is not or hardly achievable. In this case, order goods of a plurality of orders are transported to the dynamic buffer 5 intermixed and are stored in the at least one buffer lane 8 of the dynamic buffer 5. Further goods which are located between the order goods of the portion ready for packing in the buffer lane 8 in which the portion of the order goods ready for packing is stored temporarily are returned, upon the discharge of the portion ready for packing from the dynamic buffer 5, via the return lane 9 to the dynamic buffer 5. In this way, for one thing, the order goods are removed "on a single-order basis" and, for another thing, the degree of order of the order goods located in the dynamic buffer 5 is increased.

While a grouping of the order goods according to orders may be of advantage, this is not the only conceivable option. It is also conceivable that the order goods are stored temporarily in the dynamic buffer 5 sorted and/or grouped in relation to a plurality of shipping containers and/or classes of goods.

For example, the order goods contain items of clothing and the properties for forming a class of goods relate to a color of the item of clothing and/or a type of the item of clothing and/or a size of the item of clothing. A type of the item of clothing can for example relate to the distinction according to color, the distinction between top/blouse/shirt, patterned/unicolor, women/men/unisex, etc. Evidently, also combinations of said properties are possible.

In an advantageous embodiment of the system presented, the order goods are allocated to at least one class of goods according to their properties, and a shipping container is filled with order goods of only one single class of goods. In this way, a manipulation and in particular a storing of the order goods at a destination, which the shipping containers reach after the shipping, is facilitated. However, it is of course also conceivable that a shipping container is filled with order goods of a plurality of classes of goods. In this way, the shipping containers can be filled up completely, even if the number of order goods of a class of goods were insufficient to do so.

A grouping of order goods may be done, for example, by a) one order good each being allocated to one order each and the order goods of a plurality of orders being transported to the dynamic buffer 5 grouped according to orders and being stored temporarily in the at least one buffer lane 8 of the dynamic buffer 5 or b) one order good each being allocated to one shipping container and the order goods of a plurality of shipping containers being transported to the dynamic buffer 5 grouped according to shipping containers and being stored temporarily in the at least one buffer lane 8 of the dynamic buffer 5 or c) one order good being allocated to one class of goods, wherein order goods of a plurality of classes of goods are transported to the dynamic buffer 5 grouped according to classes of goods and are stored temporarily in the at least one buffer lane 8 of the dynamic buffer 5.

If this is not possible or undesired, a grouping or forming of "clusters" on the basis of the orders/shipping containers/classes of goods may also be done by a presorting buffer being connected to the dynamic buffer 5.

In this context, FIG. 2 shows an example which is very similar to the goods storage system 1a depicted in FIG. 1. In contrast to this, however, the goods storage system 1b comprises a presorting buffer 15 connected to the dynamic buffer 5, which presorting buffer 15 has a plurality of return lanes 16 and is adapted to group order goods of a plurality of orders/shipping containers/classes of goods on the basis of the orders/shipping containers/classes of goods.

In this case, order goods of a plurality of orders/shipping containers/classes of goods can be transported to the dynamic buffer 5 intermixed and be stored in the at least one buffer lane 8 of the dynamic buffer 5. Therefore, directly subsequent order goods in the infeed line 6 of the dynamic buffer 5 then form order goods of not only one single order/one single shipping container/one single class of goods. The grouping and/or the formation of "clusters" on the basis of the orders/shipping containers/classes of goods is instead done later in the presorting buffer 15. This formation of groups or clusters is of advantage for the running of the subsequent part of the order picking process, in particular for the packing of the order goods. As the order goods are grouped in the presorting buffer 15, the presorting buffer 15 can also be regarded as a "grouping buffer."

The proposed method increases the degree of order of the order goods stored temporarily in the dynamic buffer 5. In the optimal case, a mixing of different orders/shipping containers/classes of goods no longer takes place at all. However, it is also conceivable that order goods of different orders/shipping containers/classes of goods are mixed to a small degree even after passing through the presorting buffer 15. If required, the presorting buffer 15 may also be passed through a plurality of times in order to increase the degree of order in the dynamic buffer 5 step by step.

Generally, the presorting buffer 15 can be understood as part of the dynamic buffer 5, as depicted in FIG. 3. In this case, the dynamic buffer 5 has not only a return lane 9 but a plurality of return lanes 9, at least some of which are used for sorting the order goods. However, the basic function is identical with the one in the arrangement depicted in FIG. 2.

In the variant embodiment proposed, it may therefore be the case that a) one order good each is allocated to one order each, wherein the order goods of a plurality of orders are transported to the dynamic buffer 5 intermixed and are stored temporarily in the at least one buffer lane 8 of the dynamic buffer 5 and the order goods of a plurality of orders are transported from the dynamic buffer 5 into a presorting buffer 15 connected to the dynamic buffer 5 and grouped there on the basis of the orders or b) one order good each is allocated to one shipping container each, wherein the order goods of a plurality of shipping containers are transported to the dynamic buffer 5 intermixed and are stored temporarily in the at least one buffer lane 8 of the dynamic buffer 5 and the order goods of a plurality of shipping containers are transported from the dynamic buffer 5 into a presorting buffer 15 connected to the dynamic buffer 5 and grouped there on the basis of the shipping containers or b) one order good is allocated to one class of goods, wherein
   the order goods of a plurality of classes of goods are transported to the dynamic buffer 5 intermixed and are stored temporarily in the at least one buffer lane 8 of the dynamic buffer 5 and
   the order goods of a plurality of classes of goods are transported from the dynamic buffer 5 into a presorting buffer 15 connected to the dynamic buffer 5 and grouped there on the basis of the classes of goods.

It is conceivable furthermore that sub-groups are formed within the groups and/or the grouping or forming of "clusters" is done at a plurality of levels. For example,
   i) there is a combination of the cases a) and b) for order goods and a grouping on the basis of the shipping containers is done within the grouping on the basis of the orders or
   ii) there is a combination of the cases a) and c) for order goods and a grouping on the basis of the classes of goods is done within the grouping on the basis of the orders or
   iii) there is a combination of the cases b) and c) for order goods and a grouping on the basis of the classes of goods is done within the grouping on the basis of the shipping containers or vice versa or
   iv) there is a combination of the cases a) and b) and c) for order goods and a grouping on the basis of the shipping containers is done within the grouping on the basis of the orders and a grouping on the basis of the classes of goods is done within the grouping on the basis of the shipping containers or
   v) there is a combination of the cases a) and b) and c) for order goods and a grouping on the basis of the classes of goods is done within the grouping on the basis of the orders and a grouping on the basis of the shipping containers is done within the grouping on the basis of the classes of goods.

In this way, the degree of order in the flow of the order goods is increased further, whereby the running of the subsequent part of the order picking process, in particular for the packing of the order goods, is improved even further.

FIG. 4 shows an alternative embodiment of a goods storage system 1c which is very similar to the goods storage system 1b depicted in FIG. 2. In contrast to the latter, the conveyor mechanism 11, 12 is connected to the dynamic buffer 5 and/or the presorting buffer 15 at different points. Specifically, the inlet for the conveyor mechanism 11 is located directly at the beginning of the dynamic buffer 5 and the outlet of the conveyor mechanism 12 is located at the end of the presorting buffer 15. In this way, the order goods transported to the dynamic buffer 5 do not necessarily pass the presorting buffer 15 and the order goods discharged from the presorting buffer 15 do not necessarily pass the dynamic buffer 5.

In the example of the goods storage system 1b depicted in FIG. 2 and in the example of the goods storage system 1c depicted in FIG. 4, exactly one presorting buffer 15 is allocated to the dynamic buffer 5. In this way, the course of the procedure of forming groups is particularly simple, and there are no blockades between a plurality of dynamic buffers 5. While this may be advantageous, also other embodiments are conceivable.

For example, the FIG. 5 shows a goods storage system 1d in which a plurality of presorting buffers 15a, 15b, in this case two presorting buffers 15a, 15b, is allocated to a dynamic buffer 5. In this way, a particularly high sorting performance is available for the dynamic buffer 5.

It is also conceivable that one presorting buffer 15a, 15b each is allocated to a plurality of dynamic buffers 5a, 5b (operated in an automated manner), as depicted in the FIG. 6. Specifically, the goods storage system 1e comprises two dynamic buffers 5a, 5b and two presorting buffers 15a, 15b. Evidently, however, more than two dynamic buffers 5a, 5b and more than two presorting buffers 15a, 15b may be provided. In addition, the goods storage system 1e comprises bypass lanes 17a, 17b, via which order goods can be guided without passing the dynamic buffer 5a, 5b.

Finally, FIG. 7 shows an example of a goods storage system 1f in which a presorting buffer 15 is allocated to a plurality of dynamic buffers 5a, 5b. In this way, the goods storage system 1f needs relatively little space overall.

It is generally of advantage if a ratio between a total number $n_1$ of return lanes 16 of the at least one presorting buffer 15, 15a, 15b provided in the goods storage system 1a . . . 1g and the total number $n_2$ of buffer lanes 8 of the at least one dynamic buffer 5, 5a, 5b provided in the goods storage system 1a . . . 1g is $$\frac{n_1}{n_2} = \frac{ta \cdot p \cdot m_1 \cdot f \cdot c_2 \cdot x}{c_1 \cdot b}$$

Here,
ta is a transport time needed on average by an order good to travel from the dynamic buffer 5, 5a, 5b to the presorting buffer 15, 15a, 15b,
p is a number of order goods to be provisioned by the presorting buffer 15, 15a, 15b per unit of time,
$c_1$ is a number of order goods storable in a return lane 16 of the presorting buffer 15, 15a, 15b,
$m_1$ is a total number of the presorting buffers 15, 15a, 15b comprised by the goods storage system 1a . . . 1g,
b is a number of order goods storable temporarily in the dynamic buffer at the same time 5, 5a, 5b, f is an average filling ratio of the buffer lanes 8 of the dynamic buffer 5, 5a, 5b and
$c_2$ is a number of order goods storable in a buffer lane 8 of the dynamic buffer 5, 5a, 5b.
A value of 1.5 is selected for x if the last order good of the order passing an exit of the dynamic buffer 5, 5a, 5b triggers the removal of further order goods, and a value of 2.0 is selected for x if the last order good of the order passing an entry of the presorting buffer 15, 15a, 15b triggers the removal of further order goods. Otherwise, a value therebetween is selected.

The parameter ta can also be regarded or referred to as access time, p as process performance, c1 as lane capacity of the presorting buffer 15, 15a, 15b, b as batch size, c2 as lane capacity of the dynamic buffer 5, 5a, 5b and x as sequence point factor.

The batch size b is also a measure for a number of order goods of the groups of orders simultaneously processed in the goods storage system 1a . . . 1g. The sequence point factor x takes into account how soon after registering a need for a replenishment of goods from the dynamic buffer 5, 5a, 5b into the presorting buffer 15, 15a, 15b this required replenishment is triggered and/or is actually done. If the sequence point is located at the entry of the presorting buffer 15, 15a, 15b 15, 15a, 15b, the value 2.0 is selected for the sequence point factor x. If the sequence point is located at the exit of the dynamic buffer 5, 5a, 5b, the value 1.5 is selected for the sequence point factor x. If the sequence point is located between the exit of the dynamic buffer 5, 5a, 5b and the entry of the presorting buffer 15, 15a, 15b, a representative value (i.e. a value interpolated linearly) between 1.5 and 2.0 is selected for the sequence point factor x.

The formula for the ratio between the total number $n_1$ of return lanes 16 of presorting buffers 15, 15a, 15b provided in the goods storage system 1a . . . 1g and the total number $n_2$ of buffer lanes 8 of dynamic buffers 5, 5a, 5b provided in the goods storage system 1a . . . 1g may also relate to the number of loading aids instead of the number of the order goods. In this case, instead of the number of the order goods the average filling level of the loading aids with order goods is to be used in the specified formula. Here, it is irrelevant whether all loading aids contain the same quantity of order goods or whether the loading aids accommodate different quantities of order goods.

In an illustrative example it is assumed that the access time is ta=95 sec, the process performance is p=8000 units/h, equaling 2.22 units/sec, the total number $m_1$ of presorting buffers 15, 15a, 15b comprised by the goods storage system 1a . . . 1g is 1, the lane capacity c1 of the presorting buffer 15, 15a, 15b is 216 units, the batch size is b=8000 units, f=85% is selected for the filling ratio, the lane capacity c2 of the dynamic buffer 5, 5a, 5b is 216 units and x=2 is selected for the sequence point factor. Accordingly, the sequence point is located at the exit of the dynamic buffer 5, 5a, 5b. Said units may be order goods or loading aids, provided that loading aids are used.

The following applies to the ratio between the total number $n_1$ of return lanes 16 of the presorting buffers 15, 15a, 15b provided in the goods storage system 1a . . . 1g and the total number $n_2$ of buffer lanes 8 of the dynamic buffers 5, 5a, 5b provided in the goods storage system 1a . . . 1g:

$$\frac{n_1}{n_2} = \frac{ta \cdot p \cdot m_1 \cdot f \cdot c_2 \cdot x}{c_1 \cdot b}$$

$$\frac{n_1}{n_2} = \frac{95 \cdot 2,22 \cdot 1 \cdot 0,85 \cdot 216 \cdot 2}{216 \cdot 8000} = 4,5\%$$

This means that the storage capacity of the presorting buffers 15, 15a, 15b in the goods storage system 1a . . . 1g in this example amounts to approximately 1/22 of the storage capacity of the dynamic buffers 5, 5a, 5b in the goods storage system 1a . . . 1g. In relation to the dynamic buffers 5, 5a, 5b, the presorting buffers 15, 15a, 15b are therefore relatively small, whereby the advantage of the method and goods storage system 1a . . . 1g for picking goods proposed becomes particularly clear here.

As has been mentioned, the specified example is to show merely by way of illustration that the selected procedure results in relatively small presorting buffers 15, 15a, 15b. Evidently, the selected values are not to be understood to be limiting, but the specified formula relates to a plurality of possible goods storage systems 1a . . . 1g, and other values may also be utilized.

For the sake of completeness it should also be noted that in a real goods storage system 1a . . . 1g, evidently, only natural numbers qualify for the number $n_1$ of return lanes 16 and the number $n_2$ of buffer lanes 8. When planning and/or executing a goods storage system 1a . . . 1g, any decimal places are to be rounded up or, if applicable, rounded down. In particular when rounding down, it should of course be kept in mind that the real capacity of the return lanes 16 and/or of the buffer lanes 8 will then be smaller than the value obtained by way of calculation, whereby an assumed performance cannot be achieved. In contrast to this, when rounding up, there will, accordingly, be reserves in the real system compared to the value obtained by way of calculation.

It should furthermore be noted that the specified formula relates to the ratio between the total number $n_1$ of return lanes 16 of the presorting buffers 15, 15a, 15b provided in the goods storage system 1a . . . 1g and the total number $n_2$ of buffer lanes 8 of the dynamic buffers 5, 5a, 5b provided in the goods storage system 1a . . . 1g, and therefore in particular to all goods storage systems 1a . . . 1g depicted in the FIGS. 2 to 8. However, similar formulas can also be established for certain combinations of presorting buffers 15, 15a, 15b and dynamic buffers 5, 5a, 5b.

For example, the ratio between the number $n_1$ of return lanes 16 of a presorting buffer 15, 15a, 15b and the number $n_2$ of buffer lanes 8 of a dynamic buffer 5, 5a, 5b (in this context, see also the goods storage systems 1a . . . 1g depicted in the FIGS. 2, 3, 4, 6, and 8) allocated to this presorting buffer 15, 15a, 15b is:

$$\frac{n_1}{n_2} = \frac{ta \cdot p \cdot f \cdot c_2 \cdot x}{c_1 \cdot b}$$

This means that exactly one presorting buffer 15, 15a, 15b is allocated to one dynamic buffer 5, 5a, 5b in this example.

If a plurality of presorting buffers 15, 15a, 15b is allocated to a dynamic buffer 5, 5a, 5b, the ratio between the total number $n_1$ of return lanes 16 of the presorting buffers 15, 15a, 15b and the number $n_2$ of buffer lanes 8 of the dynamic buffer 5, 5a, 5b allocated to these presorting buffers 15, 15a, 15b (see in this context also the FIG. 5) is:

$$\frac{n_1}{n_2} = \frac{ta \cdot p \cdot m_1 \cdot f \cdot c_2 \cdot x}{c_1 \cdot b}$$

If exactly one presorting buffer 15, 15a, 15b is allocated to a plurality of dynamic buffers 5, 5a, 5b, the ratio between the total number $n_1$ of return lanes 16 of the presorting buffer 15, 15a, 15b and the total number $n_2$ of buffer lanes 8 of the dynamic buffers 5, 5a, 5b allocated to this presorting buffer 15, 15a, 15b (see in this context also the FIG. 7) is:

$$\frac{n_1}{n_2} = \frac{ta \cdot p \cdot f \cdot c_2 \cdot x}{c_1 \cdot b \cdot m_2}$$

In this case, the parameter $m_2$ corresponds to a total number of the dynamic buffers comprised by the goods storage system 1a . . . 1g.

FIG. 8 shows an example of a goods storage system 1g in which repacking stations 18 for repacking the order goods coming from the store 2 onto loading aids are provided between the store 2 and the dynamic buffer 5, as well as a sorting stage 19 arranged between the dynamic buffer 5 and the picking workstation 10 is provided, which is adapted to create a sequence of the order goods as desired at the picking workstation 10. In particular, the sorting stage 19 works on the basis of a radix algorithm. Such sorting stages 19 are also known as "matrix sorters." In particular, such a matrix sorter 19 has three levels with six lanes each.

Advantageously,
the order goods allocated to the order are transported to the dynamic buffer 5 unsorted and are stored temporarily in the at least one buffer lane 8 of the dynamic buffer 5 and after the discharge from the dynamic buffer 5 and before the arrival at the picking workstation 10 the order goods pass through the sorting stage 19, in which a sequence of the order goods as desired at the picking workstation 10 is created.

This means that, during the transport to the dynamic buffer 5, the order goods allocated to the order do not yet have the sequence as desired at the picking workstation 10. In this way, the transport of the order goods to the dynamic buffer 5 and in particular the removal of the order goods from the store 2 and/or also a repacking of the order goods into a loading aid can be done in a relatively flexible manner, as no particular sequence must be observed here. This sequence is only created in a sorting stage 19 subsequent to the dynamic buffer 5.

In principle, however, it would also be conceivable for the order goods to be transported to the dynamic buffer 5 sorted (in relation to the order) and to be stored temporarily in the at least one buffer lane 8 of the dynamic buffer 5. This means that order goods of an order are then transported to the dynamic buffer 5 in a sequence as desired at the picking workstation 10 and stored temporarily in the at least one buffer lane 8 of the dynamic buffer 5. The passing through a sorting stage 19 downstream of the dynamic buffer 5 will then be obsolete.

With the help of repacking stations 18, the order goods can be repacked into or onto loading aids after the removal from the store 2 and before the transport to the dynamic buffer 5. In this way, non-transportable goods or goods which are difficult to transport can be made transportable. Moreover, the use of loading aids enables an operation of the goods storage system 1*g* with a low proneness to failure.

The goods can, of course, also be stored in loading aids in the store 2, either in the same loading aids that are used in the dynamic buffer 5 or in other loading aids (in particular in cartons). In particular hanging bags, containers or trays qualify as loading aids. A hanging bag is generally very space-saving and provides good protection for the good(s) located therein.

For example, it is of advantage if exactly one order good is contained in one loading aid. In this way, the order goods can be picked in a particularly flexible manner. However, it is also conceivable that one loading aid contains more than one order good. In this way, the dynamic buffer 5 can be designed even smaller, as the order goods are stored temporarily therein in higher density. Evidently, it is also possible for some loading aids to contain only one order good while other loading aids contain more than one order good.

For the sake of completeness it should be noted that repacking stations 18 and a sorting stage 19 need not necessarily be provided together with a goods storage system 1*g*. Rather, it is also conceivable that the goods storage system 1*g* has only one repacking station 18 or a plurality of repacking stations 18 or only one sorting stage 19. It should also be noted that the repacking station(s) 18 can also be bypassed using the bypass lane 17*a* and the sorting stage 19 can also be bypassed using the bypass lane 17*b*, unless it is necessary to repack the order goods onto loading aids and/or sort the flow of conveyed goods exiting the dynamic buffer 5.

Generally, in the goods storage systems 1*a* . . . 1*g* presented, the order good(s) is/are allocated to a shipping container. This allocation can be done in different ways.

For example, the allocation of an order good to a shipping container can be done before the temporary storing of the order good in the dynamic buffer 5, 5*a*, 5*b*. In this way, the order picking process runs in a relatively deterministic manner. For example, an allocation of an order good to a specific shipping container can be done as early as upon (or even before) removal. The order picking process is therefore easily plannable.

However, it is also conceivable that the allocation of an order good to a shipping container is done before the discharge of the order goods from the dynamic buffer 5, 5*a*, 5*b*. In this way, the part of the order picking process which is downstream of the dynamic buffer and, at least in part, also the part of the order picking process running within the dynamic buffer 5, 5*a*, 5*b* is done in a relatively deterministic manner. These parts of the order picking process are therefore easily plannable. In particular, the allocation of an order good to a shipping container is done during the temporary storing of the order good in the dynamic buffer 5, 5*a*, 5*b*.

Finally, it is also conceivable that the allocation of an order good to a shipping container is done after the discharge of the order goods from the dynamic buffer 5, 5*a*, 5*b*. The order picking process is therefore particularly flexible, as the allocation of an order good to a specific shipping container is done at a relatively late point in time and it is therefore possible to correctively intervene in the order picking process even at a relatively late point in time.

For the sake of completeness, it should also be noted that the allocation of an order good to one shipping container each has already been done before a grouping of the order goods according to shipping containers.

Generally, the measures proposed enable the provision of only relatively small dynamic buffers 5, 5*a*, 5*b*. Along with this, sorting means connected to the dynamic buffer 5, 5*a*, 5*b* (for example a presorting buffer 15, 15*a*, 15*b* connected to the dynamic buffer 5, 5*a*, 5*b* or a sorting stage 19 downstream of the dynamic buffer 5, 5*a*, 5*b*) can also be kept relatively small. As a consequence, the dynamic buffers 5, 5*a*, 5*b* as well as optional sorting means are relatively easy to integrate into the structure of a goods storage system 1.

In order to keep the dwell time of the order goods in the dynamic buffer 5, 5*a*, 5*b* particularly short, whereby the dynamic buffer 5, 5*a*, 5*b* can be configured relatively small, as well as for a particularly large picking performance of the goods storage system 1*a* . . . 1*g*, further measures can be taken. For example, a probability and/or a time needed for forming a portion ready for packing can be precalculated for different combinations of order goods, and those order goods for which the formation of a portion ready for packing is most probable and/or needs the least amount of time are transported to the dynamic buffer 5, 5*a*, 5*b* first.

It is furthermore conceivable that in order for order goods to qualify as a portion ready for packing it is checked additionally whether one or a plurality of the following conditions applies/apply:

I) the order goods of the portion ready for packing have a higher priority with regard to time than other order goods of another portion ready for packing and/or II) the size of the portion ready for packing is larger than another portion ready for packing and/or III) a grouping on the basis of an order/shipping containers/classes of goods has already been done.

Therefore, additional conditions for the discharge of the portion of the order goods ready for packing from the dynamic buffer 5, 5*a*, 5*b* and for the transport to the picking workstation 10 are checked. In the case I), urgent orders are processed preferentially. In the case II), it will be ensured that the dynamic buffer 5, 5*a*, 5*b* is emptied as thoroughly as possible. In the case III), it is finally ensured that a grouping, which is under certain circumstances required for the subsequent packing of the order goods, has already been done and does not have to be created first, for example by an operation of passing through the presorting buffer 15, 15*a*, 15*b*.

It should finally be noted that the store 2, as mentioned above, can be operated in an automated or manual manner. Similarly, the picking stations 10 and/or repacking stations 18 can be operated manually, as indicated in a symbolic manner in the figures, or in an automated manner. In this case, the repacking of the order goods onto loading aids and/or the packing of the order goods into shipping containers is done by robots.

Finally it should also be noted that the scope of protection is determined by the patent claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should be noted that the depicted devices may in reality also include more or fewer parts than depicted. The depicted devices and/or their parts may partially not be depicted to scale and/or are enlarged and/or are reduced in size. In this context, it should be noted in particular that, for reasons of improved clarity no order computer 13 is depicted in the FIGS. 5 to 8. In reality, however, an order computer 13 may, of course, be provided also in the goods storage systems 1*d* . . . 1*g* depicted in the FIGS. 5 to 8.

LIST OF REFERENCE NUMBERS

1*a* . . . 1*g* goods storage system
2 store
3 goods manipulator
4 storage rack
5, 5*a*, 5*b* dynamic buffer
6 infeed line
7 outfeed line
8 buffer lane
9 return lane
10 picking workstation
11 conveying device
12 conveying device
13 order computer
14, 14*a*, 14*b* buffer-control computer
15, 15*a*, 15*b* presorting buffer
16 return lane
17*a*, 17*b* bypass lane
18 repacking station
19 sorting stage

The invention claimed is:

1. A method for picking order goods which are allocated to an order of a plurality of orders, wherein the order comprises a plurality of shipping containers, comprising the steps:
    acquisition of said order,
    removal of the order goods allocated to the order from a store,
    transport of the order goods to a dynamic buffer having an infeed line and an outfeed line, a plurality of buffer lanes arranged between the infeed line and the outfeed line, and at least one return lane arranged between the outfeed line and the infeed line,
    temporary storage of the order goods in at least one buffer lane of the dynamic buffer,
    discharge of the order goods from the dynamic buffer via its outfeed line and transport of the order goods to a picking workstation and
    filling of a shipping container provisioned at the picking workstation with order goods, wherein checking to determine whether a portion of the order goods available in the dynamic buffer is sufficient to fill a predefinable number of shipping containers and is ready for packing, and
    the portion of the order goods ready for packing is discharged from the dynamic buffer, transported to the picking workstation and transferred, there, into the predefined number of shipping containers, wherein the predefined number of shipping containers is smaller than the total number of shipping containers necessary to fulfill the order.

2. The method according to claim 1, wherein the predefined number of shipping containers is exactly one.

3. The method according to claim 1, wherein the predefined number of shipping containers is larger than one.

4. The method according to claim 1, wherein
    the order goods in the dynamic buffer (5, 5*a*, 5*b*) are stored temporarily in loading aids and
    a loading aid contains exactly one order good.

5. The method according to claim 1, wherein
    the order goods in the dynamic buffer (5, 5*a*, 5*b*) are stored temporarily in loading aids and
    a loading aid contains more than one order good.

6. The method according to claim 1, wherein
    the order goods are allocated to at least one class of goods on the basis of their properties and
    a shipping container is filled with order goods of only one single class of goods.

7. The method according to claim 1, wherein
    the order goods are allocated to at least one class of goods on the basis of their properties and
    a shipping container is filled with order goods of a plurality of classes of goods.

8. The method according to claim 6, wherein the order goods comprise items of clothing and the properties for forming a class of goods relate to a color of the item of clothing and/or a kind of the item of clothing and/or a size of the item of clothing.

9. The method according to claim 1, wherein the allocation of an order good to a shipping container is done before the temporary storing of the order good in the dynamic buffer (5, 5*a*, 5*b*).

10. The method according to claim 1, wherein the allocation of an order good to a shipping container is done before the discharge of the order goods from the dynamic buffer (5, 5*a*, 5*b*).

11. The method according to claim 1, wherein the allocation of an order good to a shipping container is done after the discharge of the order goods from the dynamic buffer (5, 5*a*, 5*b*).

12. The method according to claim 1, wherein the order goods allocated to the order are transported to the dynamic buffer unsorted and are stored temporarily in the at least one buffer lane of the dynamic buffer and the order goods pass through a sorting stage after the discharge from the dynamic buffer and before the arrival at the picking workstation, in which a desired sequence of the order goods at the picking workstation is created.

13. The method according to claim 1, wherein the order goods allocated to the order are transported to the dynamic buffer sorted in a desired sequence at the picking workstation and stored temporarily in the at least one buffer lane of the dynamic buffer.

14. The method according to claim 1, wherein
   a) one order good each is allocated to one shipping container each, wherein
      the order goods of a plurality of orders are transported to the dynamic buffer (5, 5a, 5b) intermixed and are stored temporarily in the at least one buffer lane (8) of the dynamic buffer (5, 5a, 5b) and
      the order goods of a plurality of orders are transported from the dynamic buffer (5, 5a, 5b) into a presorting buffer (15, 15a, 15b) connected to the dynamic buffer (5, 5a, 5b) and grouped there on the basis of the orders or
   b) one order good each is allocated to one shipping container each, wherein
      the order goods of a plurality of shipping containers are transported to the dynamic buffer (5, 5a, 5b) intermixed and are stored temporarily in the at least one buffer lane (8) of the dynamic buffer (5, 5a, 5b) and
      the order goods of a plurality of shipping containers are transported from the dynamic buffer (5, 5a, 5b) into a presorting buffer (15, 15a, 15b) connected to the dynamic buffer (5, 5a, 5b) and grouped there on the basis of the shipping containers or
   b) one order good is allocated to one class of goods, wherein
      the order goods of a plurality of classes of goods are transported to the dynamic buffer (5, 5a, 5b) intermixed and are stored temporarily in the at least one buffer lane (8) of the dynamic buffer (5, 5a, 5b) and
      the order goods of a plurality of classes of goods are transported from the dynamic buffer (5, 5a, 5b) into a presorting buffer (15, 15a, 15b) connected to the dynamic buffer (5, 5a, 5b) and grouped, there, on the basis of the classes of goods.

15. The method according to claim 1, wherein
   a) one order good each is allocated to one order each and the order goods of a plurality of orders are transported to the dynamic buffer (5, 5a, 5b) grouped according to orders and are stored temporarily in the at least one buffer lane (8) of the dynamic buffer (5, 5a, 5b) or
   b) one order good each is allocated to one shipping container each and the order goods of a plurality of shipping containers are transported to the dynamic buffer (5, 5a, 5b) grouped according to shipping containers and are stored temporarily in the at least one buffer lane (8) of the dynamic buffer (5, 5a, 5b) or
   c) one order good is allocated to one class of goods, wherein order goods of a plurality of classes of goods are transported to the dynamic buffer (5, 5a, 5b) grouped according to classes of goods and are stored temporarily in the at least one buffer lane (8) of the dynamic buffer (5, 5a, 5b).

16. The method according to claim 14, wherein
   i) there is a combination of the cases a) and b) for order goods and a grouping on the basis of the shipping containers is done within the grouping on the basis of the orders or
   ii) there is a combination of the cases a) and c) for order goods and a grouping on the basis of the classes of goods is done within the grouping on the basis of the orders or
   iii) there is a combination of the cases b) and c) for order goods and a grouping on the basis of the classes of goods is done within the grouping on the basis of the shipping containers or vice versa or
   iv) there is a combination of the cases a) and b) and c) for order goods and a grouping on the basis of the shipping containers is done within the grouping on the basis of the orders and a grouping on the basis of the classes of goods is done within the grouping on the basis of the shipping containers or
   v) there is a combination of the cases a) and b) and c) for order goods and a grouping on the basis of the classes of goods is done within the grouping on the basis of the orders and a grouping on the basis of the shipping containers is done within the grouping on the basis of the classes of goods.

17. The method according to claim 1, wherein a probability and/or a time needed for forming a portion ready for packing is precalculated for different combinations of order goods, and those order goods for which the formation of a portion ready for packing is most probable and/or needs the least amount of time is transported to the dynamic buffer (5, 5a, 5b) first.

18. The method according to claim 1, wherein further goods which are located between the order goods of the portion ready for packing in the buffer lane (8) in which the portion of the order goods ready for packing is stored temporarily are returned, upon the discharge of the portion ready for packing from the dynamic buffer (5, 5a, 5b), via the return lane (9) to the dynamic buffer (5, 5a, 5b).

19. The method according to claim 1, wherein for order goods to qualify as a portion ready for packing it is checked additionally whether one or a plurality of the following conditions applies:
   I) the order goods of the portion ready for packing have a higher priority with regard to time than other order goods of another portion ready for packing and/or
   II) the size of the portion ready for packing is larger than another portion ready for packing and/or
   III) a grouping on the basis of an order/shipping containers/classes of goods has already been done.

20. The method according to claim 1, wherein the order goods are repacked into loading aids after the removal from the store (2) and before the transport to the dynamic buffer (5, 5a, 5b).

21. A goods storage system (1a ... 1g) for picking order goods allocated to at least one order comprising a plurality of shipping containers, having:
   a store (2) in which the order goods are storable,
   a dynamic buffer (5, 5a, 5b) having an infeed line (6) and an outfeed line (7), a plurality of buffer lanes (8) arranged between the infeed line (6) and the outfeed line (7) as well as at least one return lane (9) arranged between the outfeed line (7) and the infeed line (6),
   a picking workstation (10) for filling a shipping container provisioned at the picking workstation (10) with order goods,
   a conveying device (11, 12) adapted to transport order goods to the dynamic buffer (5, 5a, 5b) and from the dynamic buffer (5, 5a, 5b) to the picking workstation and
   an order computer (13) configured to acquire an order, comprising
   a buffer-control computer (14, 14a, 14b) configured to check whether a portion of the order goods available in the dynamic buffer (5, 5a, 5b) allocated to the order is sufficient to fill a predefinable number of shipping containers and is ready for packing and which is further configured to trigger the discharge of this portion of order goods ready for packing from the dynamic buffer (5, 5*a*, 5*b*) and the transport to the picking workstation (10), wherein the predefined number of shipping containers is smaller than the total number of shipping containers necessary to fulfill the order.

22. The goods storage system (1*a* . . . 1*g*) according to claim 21, comprising a presorting buffer (15, 15*a*, 15*b*) connected to the dynamic buffer (5, 5*a*, 5*b*), which presorting buffer (15, 15*a*, 15*b*) has a plurality of return lanes (16) and is adapted to group order goods of a plurality of orders/shipping containers/classes of goods on the basis of the orders/shipping containers/classes of goods.

23. The goods storage system (1*a* . . . 1*g*) according to claim 22, wherein exactly one presorting buffer (15, 15*a*, 15*b*) is allocated to one dynamic buffer (5, 5*a*, 5*b*).

24. The goods storage system (1*a* . . . 1*g*) according to claim 22, wherein a plurality of presorting buffers (15, 15*a*, 15*b*) is allocated to one dynamic buffer (5, 5*a*, 5*b*).

25. The goods storage system (1*a* . . . 1*g*) according to claim 22, wherein one presorting buffer (15, 15*a*, 15*b*) is allocated to a plurality of dynamic buffers (5, 5*a*, 5*b*).

26. The goods storage system (1*a* . . . 1*g*) according to claim 22, wherein a ratio between a total number $n_1$ of return lanes (16) of the at least one presorting buffer (15, 15*a*, 15*b*) provided in the goods storage system 1*a* . . . 1*g* and a total number $n_2$ of buffer lanes (8) of the at least one dynamic buffer (5, 5*a*, 5*b*) provided in the goods storage system (1*a* . . . 1*g*) is $$\frac{n_1}{n_2} = \frac{ta \cdot p \cdot m_1 \cdot f \cdot c_2 \cdot x}{c_1 \cdot b}$$

wherein ta is a transport time needed on average by an order good to travel from the dynamic buffer (5, 5*a*, 5*b*) to the presorting buffer (15, 15*a*, 15*b*), p is a number of order goods to be provisioned by the presorting buffer (15, 15*a*, 15*b*) per unit of time, $c_1$ s a number of order goods storable in a return lane (16) of the presorting buffer (15, 15*a*, 15*b*), $m_1$ is a total number of the presorting buffers (15, 15*a*, 15*b*) comprised by the goods storage system (1*a* . . . 1*g*), b is a number of order goods storable temporarily in the dynamic buffer at the same time (5, 5*a*, 5*b*), f is an average filling ratio of the buffer lanes (8) of the dynamic buffer (5, 5*a*, 5*b*) and $c_2$ is a number of order goods storable in a buffer lane (8) of the dynamic buffer (5, 5*a*, 5*b*) and a value of 1.5 is selected for x if the last order good of the order passing an exit of the dynamic buffer (5, 5*a*, 5*b*) triggers the removal of further order goods, and a value of 2.0 is selected for x if the last order good of the order passing an entry of the presorting buffer (15, 15*a*, 15*b*) triggers the removal of further order goods, and otherwise a value therebetween is selected.

27. The goods storage system (1*a* . . . 1*g*) according to claim 21, wherein a sorting stage is provided between the dynamic buffer and the picking workstation, which sorting stage is adapted to create a desired sequence of the order goods at the picking workstation.

\* \* \* \* \*